US011329801B2

United States Patent
Zhang et al.

(10) Patent No.: US 11,329,801 B2
(45) Date of Patent: May 10, 2022

(54) INITIALIZATION VECTOR GENERATION WHEN PERFORMING ENCRYPTION AND AUTHENTICATION IN WIRELESS COMMUNICATIONS

(71) Applicant: Apple Inc., Cupertino, CA (US)

(72) Inventors: Dawei Zhang, Saratoga, CA (US); Fangli Xu, Beijing (CN); Haijing Hu, Beijing (CN); Huarui Liang, Beijing (CN); Lijia Zhang, Beijing (CN); Robert K. Kitchens, Cupertino, CA (US); Samuel D. Post, San Jose, CA (US); Shu Guo, Beijing (CN); Xiangying Yang, Cupertino, CA (US); Yannick L. Sierra, San Francisco, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 16/733,515

(22) Filed: Jan. 3, 2020

(65) Prior Publication Data

US 2020/0235914 A1 Jul. 23, 2020

(30) Foreign Application Priority Data

Jan. 21, 2019 (CN) .......................... 201910052248.5

(51) Int. Cl.
*H04L 9/06* (2006.01)
*H04L 29/06* (2006.01)
*H04W 12/06* (2021.01)
*H04W 12/04* (2021.01)
*H04L 9/08* (2006.01)

(52) U.S. Cl.
CPC .......... *H04L 9/0637* (2013.01); *H04L 9/0869* (2013.01); *H04L 63/0428* (2013.01); *H04L 63/061* (2013.01); *H04W 12/04* (2013.01); *H04W 12/06* (2013.01); *H04L 2209/80* (2013.01); *H04L 2463/061* (2013.01)

(58) Field of Classification Search
None
See application file for complete search history.

(56) References Cited

U.S. PATENT DOCUMENTS

2018/0062847 A1* 3/2018 Mildh .................... H04L 9/0643
2018/0069699 A1* 3/2018 Bowman ............... H04L 9/0841

* cited by examiner

*Primary Examiner* — Brandon S Hoffman
(74) *Attorney, Agent, or Firm* — Kowert, Hood, Munyon, Rankin & Goetzel, P.C.

(57) ABSTRACT

Apparatuses, systems, and methods for generating and utilizing improved initialization vectors (IVs) when performing encryption and authentication in wireless communications. In some scenarios, a wireless communication device may generate one or more pseudorandom multi-bit values, e.g., using a respective plurality of key derivation functions (KDFs). A first portion of each value may be used as a respective key for encryption or authentication of traffic on the user plane or the control plane. A second portion of each value may be used as a nonce value in a respective IV for use with a respective key for encryption or authentication of traffic on the user plane or the control plane. In some scenarios, the nonce values may instead be generated as part of an additional pseudorandom value (e.g., by executing an additional KDF), from which all of the IVs may be drawn.

20 Claims, 6 Drawing Sheets

| COUNT (32) | BEARER (5) | DIRECTION (1) | Zero padding (26) | Block counter (32) |

FIG. 5A
(prior art)

| COUNT (32) | BEARER (5) | DIRECTION (1) | Nonce (42) | Block counter (16) |

FIG. 5B

| COUNT (32) | BEARER (5) | DIRECTION (1) | Nonce (58) |

FIG. 5C

| COUNT (32) | BEARER (5) | DIRECTION (1) | Nonce (74) | Block counter (16) |

FIG. 5D

| COUNT (32) | BEARER (5) | DIRECTION (1) | Nonce (90) |

FIG. 5E

INITIALIZATION VECTOR GENERATION WHEN PERFORMING ENCRYPTION AND AUTHENTICATION IN WIRELESS COMMUNICATIONS

PRIORITY CLAIM

This application claims benefit of priority of Chinese application Serial No. 201910052248.5, titled "Initialization Vector Generation when Performing Encryption and Authentication in Wireless Communications", filed Jan. 21, 2019, whose inventors are Dawei Zhang et al., which is hereby incorporated by reference in its entirety as though fully and completely set forth herein.

FIELD

The present application relates to wireless devices, and more particularly to apparatus, systems, and methods for secure cellular communications, such as 3GPP 5G-NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. The anticipated ubiquity of 5G communications across many important fields, demands that such communications remain secure against unauthorized reception or spoofing.

Consequently, efforts are being made in ongoing developments of 5G-NR to improve communication security.

SUMMARY

Embodiments relate to apparatuses, systems, and methods for generating and utilizing improved initialization vectors (IVs) when performing encryption and authentication in wireless communications.

A wireless communication device may perform a method for generating encrypted communications. For example, the wireless communication device may generate a first pseudorandom multi-bit value. The wireless communication device may encrypt a first set of one or more blocks of communication data using an encryption algorithm that utilizes an encryption key as a first input and an encryption initialization vector as a second input, wherein, while encrypting the communication data, the encryption algorithm utilizes a first encryption key including a first subset of bits of the first pseudorandom multi-bit value, and a first encryption initialization vector including a second subset of bits of the first pseudorandom multi-bit value. The wireless communication device may transmit the encrypted communication data on a user plane.

In some scenarios, the wireless communication device may encrypt a plurality of sets of one or more blocks of communication data using the encryption algorithm, wherein the encryption initialization vector further includes a counter that is incremented following encryption of each set of one or more blocks. The wireless communication device may generate a new iteration of the first pseudorandom multi-bit value when the counter resets to an initial value.

In some scenarios, the wireless communication device may generate a second pseudorandom multi-bit value. The wireless communication device may encrypt control information using the encryption algorithm, wherein, while encrypting the control information, the encryption algorithm utilizes a second encryption key including a first subset of bits of the second pseudorandom multi-bit value, and a second encryption initialization vector including a second subset of bits of the second pseudorandom multi-bit value. The wireless communication device may transmit the encrypted control information.

In some scenarios, the wireless communication device may generate a third pseudorandom multi-bit value. The wireless communication device may encode the communication data using an authentication encoding algorithm that uses an integrity key as a first input and an integrity initialization vector as a second input, wherein, while encoding the communication data, the authentication encoding algorithm utilizes a first integrity key including a first subset of bits of the third pseudorandom multi-bit value, and a first integrity initialization vector including a second subset of bits of the third pseudorandom multi-bit value.

In some scenarios, the wireless communication device may generate a fourth pseudorandom multi-bit value. The wireless communication device may encode the control information using the authentication encoding algorithm, wherein, while encoding the control information, the authentication encoding algorithm utilizes a second integrity key including a first subset of bits of the fourth pseudorandom multi-bit value, and a second integrity initialization vector including a second subset of bits of the fourth pseudorandom multi-bit value.

In some scenarios, the wireless communication device may receive a first encrypted communication signal on the user plane. The wireless communication device may decrypt a first set of one or more blocks of the received communication signal using a decryption algorithm that utilizes an encryption key as a first input and an encryption initialization vector as a second input, wherein, while decrypting the first encrypted communication signal, the decryption algorithm utilizes the first encryption key as the first input, and the first encryption initialization vector as the second input.

A wireless communication device may perform a method for generating encrypted communications. For example, the wireless communication device may execute a key derivation function (KDF) a first time to generate a first encryption key. The wireless communication device may also execute the KDF a second time to generate a nonce value. The wireless communication device may encrypt data using an encryption algorithm that utilizes an encryption key as a first input and an initialization vector as a second input, wherein, while encrypting a portion of the data for transmission on a user plane, the encryption algorithm utilizes the first encryption key as the first input, and a first initialization vector including a first subset of bits of the nonce value as the second input. The wireless communication device may transmit the encrypted data.

In some scenarios, the wireless communication device may execute the KDF a third time to generate a second encryption key. While encrypting a portion of the data for transmission on a control plane, the encryption algorithm may utilize the second encryption key as the first input, and a second initialization vector including a second subset of bits of the nonce value as the second input.

In some scenarios, the wireless communication device may execute the KDF a fourth time to generate a first integrity key. The wireless communication device may encode data using an authentication encoding algorithm that uses an integrity key as a first input and an initialization vector as a second input. While encoding a portion of the data for transmission on the user plane, the authentication encoding algorithm may utilize the first integrity key as the first input, and a third initialization vector including a third subset of bits of the nonce value as the second input.

In some scenarios, the wireless communication device may execute the KDF a fifth time to generate a second integrity key. While encoding a portion of the data for transmission on the control plane, the authentication encoding algorithm may utilize the second integrity key as the first input, and a fourth initialization vector including a fourth subset of bits of the nonce value as the second input.

In some scenarios, the wireless communication device may encrypt a plurality of sets of one or more blocks of communication data using the encryption algorithm, wherein the encryption initialization vector further includes a counter that is incremented following encryption of each set of one or more blocks. The wireless communication device may generate a new iteration of the first pseudorandom multi-bit value when the counter resets to an initial value.

A wireless communication device may perform a method for receiving encrypted communications. For example, the wireless communication device may a first pseudorandom multi-bit value. The wireless communication device may receive a first encrypted communication signal on a user plane. The wireless communication device may decrypt a first set of one or more blocks of the received communication signal using a decryption algorithm that utilizes an encryption key as a first input and an encryption initialization vector as a second input. While decrypting the first encrypted communication signal, the decryption algorithm may utilize a first encryption key including a first subset of bits of the first pseudorandom multi-bit value as the first input, and a first encryption initialization vector including a second subset of bits of the first pseudorandom multi-bit value as the second input.

A wireless communication device may perform a method for receiving encrypted communications. the wireless communication device may execute a key derivation function (KDF) a first time to generate a first encryption key, and execute the KDF a second time to generate a nonce value. The wireless communication device may receive a first encrypted communication signal on a user plane. The wireless communication device may decrypt a first set of one or more blocks of the received communication signal using a decryption algorithm that utilizes an encryption key as a first input and an encryption initialization vector as a second input. While decrypting the first encrypted communication signal, the decryption algorithm may utilize the first encryption key as the first input, and a first encryption initialization vector including a first subset of bits of the nonce value as the second input.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 5A-5E illustrate various examples of initialization vector (IV) formats, according to some embodiments;

Figure 1:
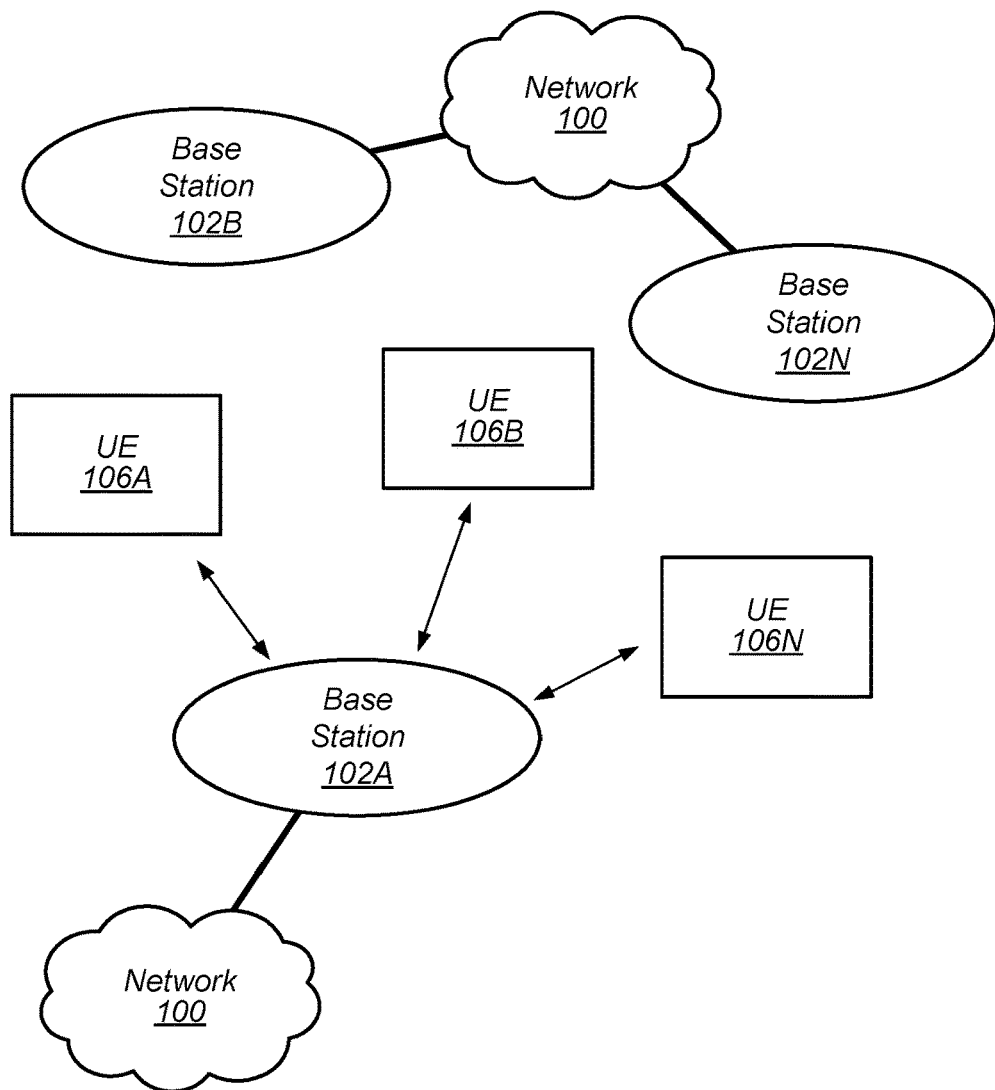
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms
 The following acronyms are used in this disclosure.
 AES: Advanced Encryption Standard
 BS: Base Station
 CBC: Cipher Block Chaining
 CMAC: Cypher-based Message Authentication Code
 CTR: Counter
 DES: Data Encryption Standard
 GCM: Galois/Counter Mode
 GSM: Global System for Mobile Communications
 IV: Initialization Vector KDF: Key Derivation Function
LTE: Long Term Evolution
MAC: Message Authentication Code
NEA: NR Encryption Algorithm
NIA: NR Integrity Algorithm
NR: New Radio
OFB: Output Feedback
UE: User Equipment
UMTS: Universal Mobile Telecommunications System
WLAN: Wireless Local Area Network
XCBC: eXtended Ciphertext Block Chaining
Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
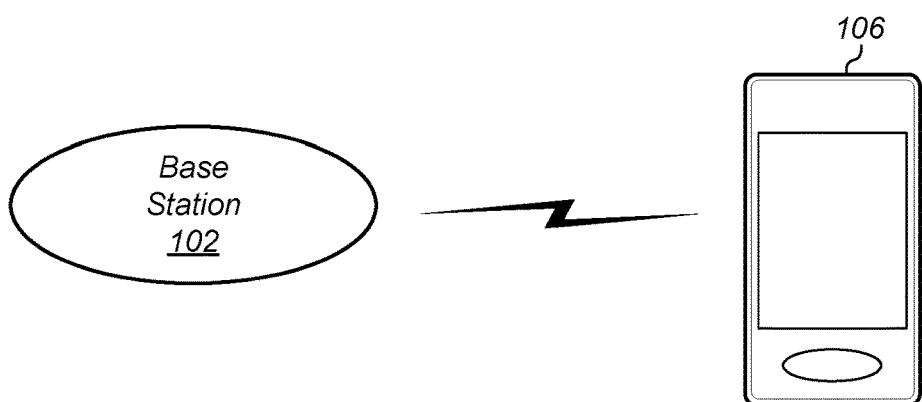
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G-NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G-NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G-NR) base station, or "gNB". In some embodiments, a gNB may be connected to a legacy evolved packet core (EPC) network and/or to a NR core (NRC) network. In addition, a gNB cell may include one or more transmission and reception points (TRPs), which may include an antenna panel (i.e., a panel containing one or more arrays of antenna elements). In addition, a UE capable of operating according to 5G-NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G-NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G-NR (or LTE or 1×RTT or LTE or GSM), and separate radios for communicating using each of Wi-Fi and Bluetooth. Other configurations are also possible.

Figure 3:
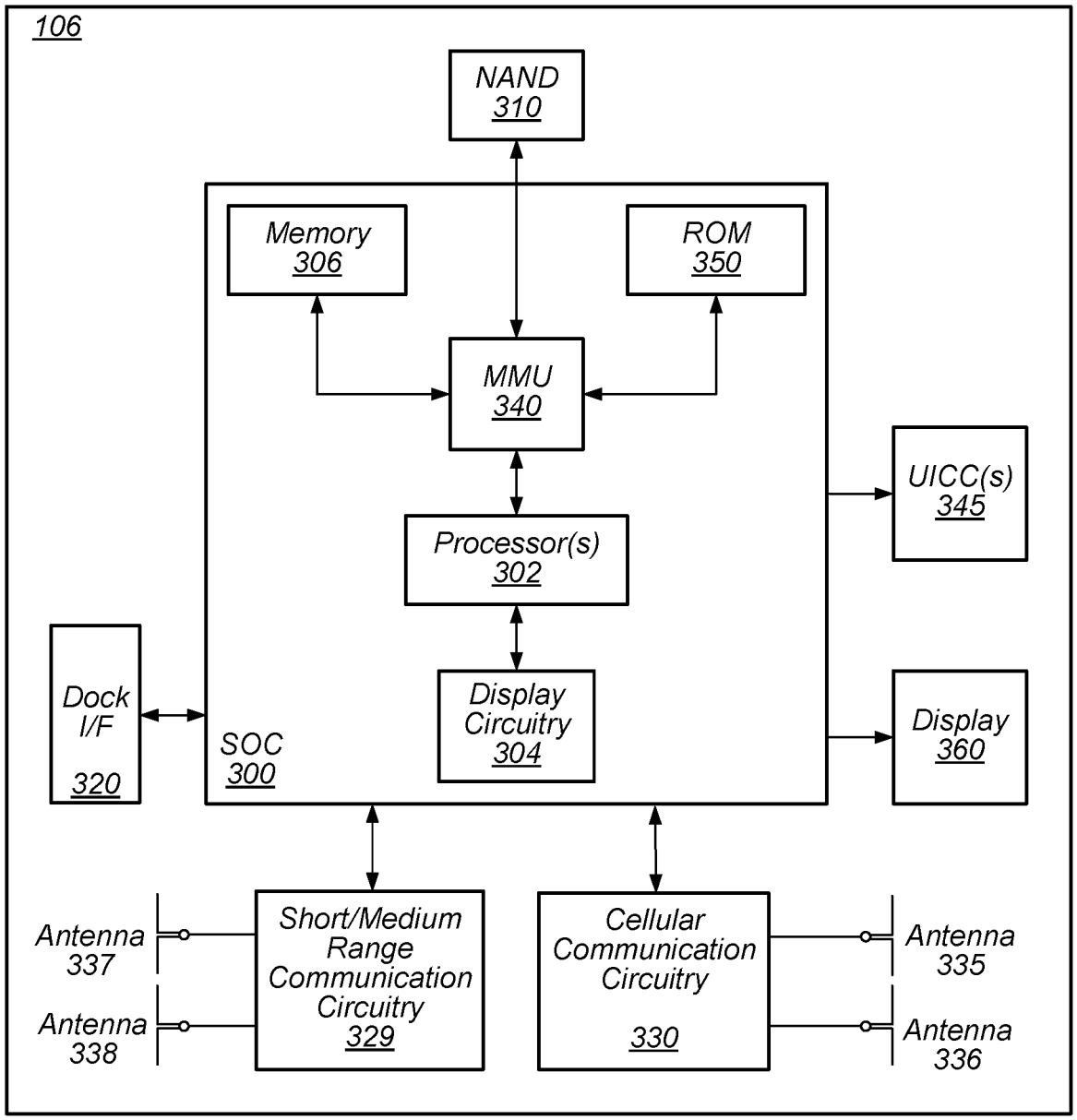
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G-NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G-NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G-NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method as disclosed below.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include processing circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include processing circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
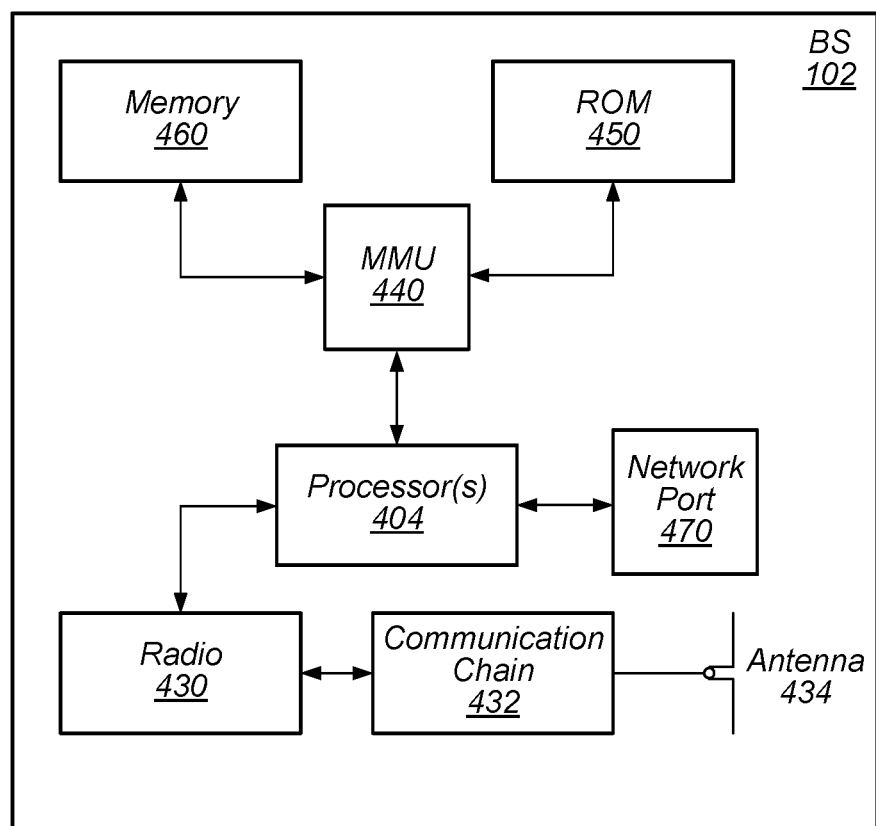
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G-NR) base station, or "gNB". In such embodiments, base station 102 may be connected to a legacy evolved packet core (EPC) network and/or to a NR core (NRC) network. In addition, base station 102 may be considered a 5G-NR cell and may include one or more transmission and reception points (TRPs). In addition, a UE capable of operating according to 5G-NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G-NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G-NR radio for performing communication according to 5G-NR. In such a case, the base station 102 may be capable of operating as both an LTE base station and a 5G-NR base station. As another possibility, the base station 102 may include a multi-mode radio which is capable of performing communications according to any of multiple wireless communication technologies (e.g., 5G-NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

FIG. 5—Example IV Formats

In order to provide communication security, some communication protocols both encrypt signals for confidentiality and encode signals for integrity protection. Encryption may be performed according to any of various encryption algorithms, such as Data Encryption Standard (DES), Advanced Encryption Standard-Counter (AES), SNOW 3G, ZUC, etc., using various modes of operation, such as AES-Counter (AES-CTR), AES-Cipher Block Chaining (AES-CBC), AES-Output Feedback (AES-OFB), etc. Encoding for integrity protection, or authentication, may be performed according to any of various encoding algorithms, such as Cipher Block Chaining-Message Authentication Code (AES-CBC-MAC), AES One-key Message Authentication Code (AES-OMAC), AES-Cypher-based Message Authentication Code (AES-CMAC), etc. Some protocols may utilize a single algorithm or mode of operation to perform both confidentiality encryption and integrity authentication. Such modes of operation may include Galois/Counter Mode (GCM; such as AES-GCM), eXtended Ciphertext Block Chaining (XCBC; such as AES-XCBC), etc.

As one example protocol, in 5G-NR, the confidentiality encryption and the integrity protection may be performed separately. For example, the algorithm used for confidentiality encryption may be referred to as NR Encryption Algorithm (NEA), and may utilize AES-CTR. The algorithm used for integrity protection may be referred to as NR Integrity Algorithm (NIA), and may utilize AES-CMAC.

Many encryption and/or integrity protection algorithms (including, e.g., AES-CTR and AES-GCM) utilize three inputs: the data to be encrypted/encoded, a key, and an Initialization Vector (IV). In some scenarios, the same key and IV may be used (e.g., by a remotely located receiving device) to decrypt/decode any data that has been encrypted/encoded using the key and IV. The algorithms for decrypting and/or decoding the data may be the same as for encrypting/encoding the data, or may be complementary algorithms; in either case, the algorithms for decrypting/decoding the data may be configured to recover the data used as the first input to the encrypting/encoding algorithms.

In some scenarios, any of various attacks may be able to compromise the security of a message if the key and/or the IV is known to the attacker. Thus, the key may be, or include, a pseudorandom value known to two communicating parties, which is intended to not be known by other parties. To improve the security of the key, a new value may be periodically generated. Security may be further improved if the IV also includes a random component.

FIG. 5A illustrates an example of a less-secure IV that does not include a random component. The IV of FIG. 5A may be used, e.g., as an input to an encryption and/or encoding algorithm, e.g., to prepare communication or control data for transmission.

As shown, the IV may include a COUNT field, which may constitute 32 bits. The COUNT field may represent a count of a number of encryptions performed. For example, the value of the COUNT field may be incremented each time one or more blocks of data are encrypted. Thus, each time an encryption is performed, the IV used may be different than the IV used in a preceding encryption, at least in that the COUNT field has been incremented. However, once the COUNT value has been incremented more than $2^{32}$ times (e.g., if more than $2^{32}$ encryptions have been performed), the COUNT value may roll over, e.g., resetting or returning to its initial value. According to some algorithms or modes of operation, a new key may be generated when (e.g., in response to, in association with, or at approximately the same time as) the COUNT value rolls over.

As shown, the IV may include a BEARER field, which may include a bearer identifier of a signal bearer that will carry the encrypted data. As one example, the BEARER field may constitute 5 bits. The IV may include a DIRECTION field, which may indicate whether the encrypted data is to be carried in the uplink or downlink direction. As one example, the DIRECTION field may constitute 1 bit. The IV may include a "block counter" field, which may constitute 32 bits. The "block counter" field may indicate the number of blocks to be encrypted in the present encryption instance; e.g., the number of blocks that will be encrypted using the present IV.

It should be noted that multiple (e.g., all) bearers may use the same key and IV. Thus, the same value of COUNT may be used more than one time, e.g., with different values of BEARER and/or DIRECTION, while still providing a unique IV for each instance. Therefore, in some circumstances, the value of COUNT may not be incremented between encodings in which the values of BEARER and/or DIRECTION change.

As shown, the IV may also include one or more bits of zero padding. Specifically, in the example of FIG. 5A, the IV is 96 bits, so the 26 bits not included in any of the fields described above may be padded with zeros.

It should be understood that the IV shown is merely one example, and other examples may include different numbers of bits in any of the described fields and/or may include more or less fields than those shown. For example, in some scenarios, an IV may include 128 bits. However, some algorithms, such as GCM, may be defined by standards that define certain aspects of the IV to be used with applicable algorithms or modes of operation. For example, the NIST GCM specification (800-38D, Section 8.3) specifies that, when not using a 96-bit deterministic construction for the IV, the IV is limited to $2^{32}$ invocations of a given key, e.g., before generating a new key or resetting the COUNT value.

It should be noted that the IV shown in FIG. 5A may define up to $2^{38}$ invocations ($2^{32}*2^5*2^1$), due to reuse of a single COUNT value with multiple BEARER and/or DIRECTION values. Therefore, use of the 96-bit construction may be advantageous in light of applicable specifications, so as to avoid the limit of $2^{32}$ invocations.

It should be noted that the value of the IV shown in FIG. 5A may periodically repeat, e.g., once the value of COUNT rolls over. The security of the encryption algorithm may be compromised if the value of the key used also repeats a previously used value—e.g., if the combination of the key and the IV is the same combination as used in a prior instance of the encryption algorithm. To avoid this, the key may include a large number of bits, such as 128 or 256. However, even with a 128-bit key, the probability of a collision (e.g., of a repeated value) is approximately 0.5 after $2^{64}$ encryptions. Although this number is high, it could plausibly be reached, and the probability of a collision is not negligible, even at lower number of encryptions.

In light of the above, it may be advantageous to introduce random (or pseudorandom) bits into the IV. In this way, repetition of the IV may be eliminated or significantly reduced, thus improving security even if a key collision occurs.

Each of FIGS. 5B-5E illustrate an example IV include a pseudorandom "nonce" value. For example, FIG. 5B illustrates an example IV, in which the COUNT, BEARER, DIRECTION, and block counter fields operate in the same manner as described in connection with FIG. 5A. However, the zero padding has been replaced with a pseudorandom nonce value. As shown, the block counter field has been reduced to 16 bits, while the nonce value consists of 42 bits, with a total IV length of 96 bits. However, in other scenarios, the block counter could remain at 32 bits, and the nonce value could consist of 26 bits, exactly replacing the zero padding of FIG. 5A. Other variations in field lengths are also envisioned. In some scenarios, the block counter may be omitted entirely, allowing for a longer nonce field of 58 bits, e.g., as shown in FIG. 5C. In some scenarios, other fields may additionally, or alternatively, be omitted.

Each of FIGS. 5D and 5E illustrates an example of an IV having a total length of 128 bits. As shown in FIG. 5D, the nonce field may consist of 74 bits, while the block counter field consists of 16 bits. Other field lengths are also envisioned. For example, as shown in FIG. 5E, the block counter field may be omitted, allowing for a longer nonce field of 90 bits. In some scenarios, other fields may additionally, or alternatively, be omitted. A longer nonce field may increase the randomness included in the IV, which may increase the overall security of the encryption/encoding algorithm.

Figure 6:
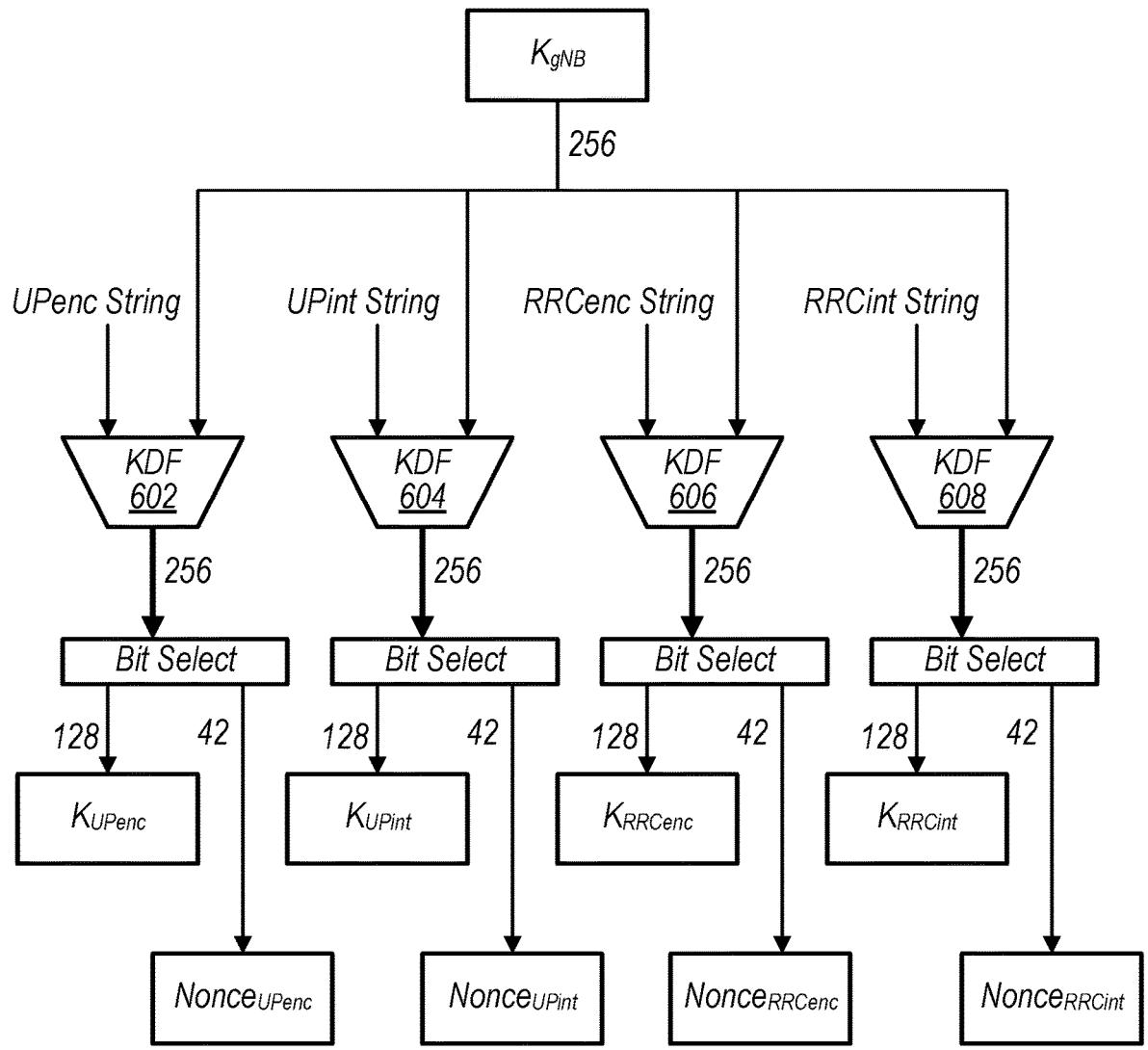
FIG. 6 illustrates example logic for generating a plurality of keys for use in encrypting and authenticating communications, wherein the generation of each key further results in a respective pseudorandom nonce value, according to some embodiments.

FIG. 6—Generating Randomized IV Using Extra Key Bits

A communication device configured to participate in secure communications, such as the base station 102 or the UE 106, may be configured to generate one or more key(s) and IV(s) for use in such secure communications. For example, while establishing communications with each other, two wireless communication devices may exchange information allowing the devices to each derive and store an identical long-term key K. In some scenarios, each device may perform further operations using the long-term key K to generate additional keys for use in secure communications. Thus, the long-term key K may serve as a key for generating derivative keys having specific uses. Those derivative keys may, in turn, be used in generating yet more specific keys. For example, a UE, such as the UE 106, may generate a derivative key $K_{gNB}$ for use in communicating with a particular base station (e.g., a gNB), such as the base station 102. The UE 106 may, in some scenarios, use additional layers of derivative keys in generating $K_{gNB}$ (e.g., CK, IK, $K_{AUSF}$, $K_{SEAF}$, and/or $K_{AMF}$, as known in the art). The base station 102 (and/or other network components) may use a similar or identical method to generate an identical $K_{gNB}$. The UE 106 and the base station 102 may then apply one or more additional function(s) to $K_{gNB}$ to generate further derivative keys having specific function in encrypting (or ciphering) and/or authenticating (or performing integrity protection) communications between the UE 106 and the base station 102. Advantageously, in some scenarios, nonce values for use in the IV may also be generated in the course of this key generation process.

For example, FIG. 6 illustrates example logic for generating four keys for use in encrypting and authenticating communications between the UE 106 and the base station 102, based on the key $K_{gNB}$, wherein the generation of each key further results in a respective nonce value, according to some embodiments. The logic of FIG. 6 may be implemented by the UE 106. The logic of FIG. 6 may also, or alternatively, be implemented by the base station 102.

As illustrated in FIG. 6, a communication device (e.g., the UE 106 or the base station 102) may execute a key derivation function (KDF) 602 to generate an encryption (or ciphering) key $K_{UPenc}$ for use in encrypting communications to be transmitted on the user plane. The KDF 602 may include any form or algorithm of KDF known in the art. It should be understood that the UE 106 and the base station 102 may execute the same KDF 602 to generate the same encryption key $K_{UPenc}$. The encryption key $K_{UPenc}$ may be, or include, a pseudorandom multi-bit value. The KDF 602 may take as inputs two or more values known to both the UE 106 and the base station 102. For example, one input may be, or include, the key $K_{gNB}$. Another input may be, or include, a string or other value specifically associated with generating the key $K_{UPenc}$. For example, as shown, the KDF 602 receives an input UPenc String, which may include a first value associated with (e.g., identifying) the user plane encoding function, a second value identifying the cipher algorithm to be used, and/or other information relevant to the encryption of communications to be transmitted on the user plane.

In some scenarios, the output of the KDF 602 may include more bits than will be used as the encryption key $K_{UPenc}$. For example, as illustrated in FIG. 6, $K_{gNB}$ is 256 bits, as is the output of the KDF 602. However, in some scenarios, the encryption algorithm for encrypting communications to be transmitted on the user plane may utilize an encryption key of only 128 bits. Thus, the encryption key $K_{UPenc}$ may include, or consist of, a subset of the bits of the output of the KDF 602. In some scenarios, the encryption key $K_{UPenc}$ may consist of the 128 most significant bits of the output of the KDF 602.

The remaining bits of the output of the KDF 602 may not be utilized in any key. Thus, some or all of the remaining bits of the output of the KDF 602 may instead by utilized as a nonce value in an IV. For example, the communication device may generate an encryption (or ciphering) IV, $IV_{UPenc}$, for use in encrypting the communications to be transmitted on the user plane. The $IV_{UPenc}$ may include a nonce value, $Nonce_{UPenc}$, including a subset of the bits of the output of the KDF 602. For example, $Nonce_{UPenc}$ may include bits that are not included in the key $K_{UPenc}$, such as an appropriate number of the least significant bits of the output of the KDF 602, or, alternatively, an appropriate number of the most significant bits not included in the key $K_{UPenc}$, or any other selection of bits of the output of the KDF 602.

$Nonce_{UPenc}$ may be any appropriate number of bits up to the number remaining of the output of the KDF 602, after subtracting the number of bits to be used for $K_{UPenc}$. For example, if the output of the KDF 602 is 256 bits, and the key $K_{UPenc}$ is 128 bits, then $Nonce_{UPenc}$ may be any appropriate number of bits up to 128 bits. Thus, $Nonce_{UPenc}$ may be 42 bits in length, e.g., to accommodate an IV having the structure illustrated in FIG. 5B. Similarly, $Nonce_{UPenc}$ may be 58, 74, or 90 bits in length, to accommodate an IV having the structure illustrated in FIG. 5C, FIG. 5D, or FIG. 5E, respectively. It should be understood that these lengths are merely examples; $Nonce_{UPenc}$, $K_{UPenc}$, and/or the output of the KDF 602 may have other lengths, as appropriate for specific embodiments.

It should be understood that the UE 106 and the base station 102 may generate the same encryption IV, $IV_{UPenc}$, using the same $Nonce_{UPenc}$. For example, under normal circumstances, the UE 106 and the base station 102 may each generate the same values for both the encryption key $K_{UPenc}$ and the encryption IV, $IV_{UPenc}$. Thus, either the of the UE 106 or the base station 102 may encrypt communication data (e.g., a set of one or more blocks of communication data) using an encryption algorithm that utilizes as inputs the encryption key $K_{UPenc}$ and the encryption IV, $IV_{UPenc}$. Similarly, either the of the UE 106 or the base station 102 may decrypt received communication data using a decryption algorithm that utilizes as inputs the encryption key $K_{UPenc}$ and the encryption IV, $IV_{UPenc}$. In scenarios in which the encoding algorithm is symmetrical, this may allow either device to use $K_{UPenc}$ and $IV_{UPenc}$ to decrypt communication data that was encrypted by the other device using the same values of $K_{UPenc}$ and $IV_{UPenc}$.

As shown in FIG. 6, the communication device may execute additional KDFs to generate additional keys and additional nonce values in a manner similar to the KDF 602. For example, as illustrated, the communication device may execute a KDF 604 to generate an integrity (or authentication) key $K_{UPint}$ for use in encoding communications to be transmitted on the user plane, using an authentication encoding algorithm. The integrity key $K_{UPint}$ may be, or include, a pseudorandom multi-bit value. The KDF 604 may take as inputs two or more values known to both the UE 106 and the base station 102. For example, one input may be, or include, the key $K_{gNB}$. Another input may be, or include, a string or other value specifically associated with generating the key $K_{UPint}$. For example, as shown, the KDF 604 receives an input UPint String, which may include a first value associated with (e.g., identifying) the user plane authentication function, a second value identifying the authentication encoding algorithm to be used, and/or other information relevant to the encoding of communications to be transmitted on the user plane.

Similarly, the communication device may execute a KDF 606 to generate an encryption key $K_{RRCenc}$ for use in encrypting communications to be transmitted on a control plane, as well as a KDF 608 to generate an integrity key $K_{RRCint}$ for use in encoding communications to be transmitted on the control plane, using an authentication encoding algorithm. Each key may be, or include, a pseudorandom multi-bit value. Each KDF may take as inputs two or more values known to both the UE 106 and the base station 102, such as the key $K_{gNB}$ and a respective string or other value specifically associated with generating the respective key. For example, as shown, the KDF 606 receives an input RRCenc String, which may include a first value associated with (e.g., identifying) the control plane encryption function, a second value identifying the encryption algorithm to be used, and/or other information relevant to the encryption of communications to be transmitted on the control plane. Similarly, the KDF 608 is shown as receiving an input RRCint String, which may include a first value associated with (e.g., identifying) the control plane authentication function, a second value identifying the authentication encoding algorithm to be used, and/or other information relevant to the encoding of communications to be transmitted on the control plane.

Like the output of the KDF 602, the outputs of the KDFs 604, 606, and 608 may each include more bits than will be used as the respective key. For example, as illustrated in FIG. 6, the outputs of the KDFs 604, 606, and 608 are each 256 bits, while the keys $K_{UPint}$, $K_{RRCint}$, and $K_{RRCenc}$ are each 128 bits in length. Thus, each key may include, or consist of, a subset of the bits of the output of the respective KDF, such as, e.g., the 128 most significant bits. It should be understood that these lengths are merely examples, and that other lengths are possible.

The remaining bits of the output of each KDF may by utilized as a nonce value in an associated IV. For example, the communication device may generate an integrity (or authentication) IV, $IV_{UPint}$, for use in encoding the communications to be transmitted on the user plane, using an authentication encryption algorithm. The $IV_{UPint}$ may include a nonce value, $Nonce_{UPint}$, including a subset of the bits of the output of the KDF 604. For example, $Nonce_{UPint}$ may include bits that are not included in the key $K_{UPint}$, such as an appropriate number of the least significant bits of the output of the KDF 604, or, alternatively, an appropriate number of the most significant bits not included in the key $K_{UPint}$, or any other selection of bits of the output of the KDF 604. Similarly, the communication device may generate an encryption IV, $IV_{RRCenc}$, for use in encrypting the communications to be transmitted on the control plane. The $IV_{RRCenc}$ may include a nonce value, $Nonce_{RRCenc}$, including a subset of the bits of the output of the KDF 606. Similarly, the communication device may generate an integrity IV, $IV_{RRCint}$, for use in encoding the communications to be transmitted on the control plane, using an authentication encryption algorithm. The $IV_{RRCint}$ may include a nonce value, $Nonce_{RRCint}$, including a subset of the bits of the output of the KDF 608.

Like $Nonce_{UPenc}$, the nonce values $Nonce_{UPint}$, $Nonce_{RRCenc}$, and $Nonce_{RRCint}$ may be any appropriate number of bits up to the number remaining from the output of the respective KDF, after subtracting the number of bits to be used for the respective corresponding key. For example, as illustrated in FIG. 6, each nonce value may include up to 128 bits. In some scenarios, other lengths are also possible, as appropriate for specific embodiments.

It should be understood that the UE 106 and the base station 102 may generate the same values of $IV_{UPint}$, $IV_{RRCenc}$, and $IV_{RRCint}$ using the same respective nonce values. Thus, either the of the UE 106 or the base station 102 may encrypt and/or encode for integrity authentication either user plane communication data or control plane data, using the appropriate key(s) and IV(s). Similarly, either the of the UE 106 or the base station 102 may decrypt and/or decode received user plane or control plane data using the same key(s) and IV(s).

Thus, a first communication device may conduct secure communications with a second communication device as follows. The first communication device may generate one or more pseudorandom multibit values (e.g., the outputs of one or more of the KDFs 602-608). The first communication device may encrypt a first set of one or more blocks of communication data using an encryption algorithm that utilizes an encryption key as a first input and an encryption initialization vector as a second input. For example, while encrypting the communication data, the encryption algorithm may utilize a first encryption key (e.g., $K_{UPenc}$) including a first subset of bits of the first pseudorandom multi-bit value, and a first encryption initialization vector (e.g., $IV_{UPenc}$) including a second subset of bits of the first pseudorandom multi-bit value.

Additionally, or alternatively, the first communication device may encode the first set of one or more blocks of communication data using an authentication encoding algorithm that utilizes an integrity key as a first input and an integrity initialization vector as a second input. For example, while encoding the communication data, the authentication encoding algorithm may utilize a first integrity key (e.g., $K_{UPint}$) including a first subset of bits of the second pseudorandom multi-bit value, and a first integrity initialization vector (e.g., $IV_{UPint}$) including a second subset of bits of the second pseudorandom multi-bit value.

Once the set of one or more blocks of communication data has been encrypted and/or encoded, the first communication device may transmit the set of one or more blocks of communication data on the user plane.

Similarly, the first communication device may encrypt a first set of one or more blocks of control information using the encryption algorithm. For example, while encrypting the control information, the encryption algorithm may utilize a second encryption key (e.g., $K_{RRCenc}$) including a first subset of bits of the third pseudorandom multi-bit value, and a second encryption initialization vector (e.g., $IV_{RRCenc}$) including a second subset of bits of the third pseudorandom multi-bit value.

Additionally, or alternatively, the first communication device may encode the first set of one or more blocks of control information using the authentication encoding algorithm. For example, while encoding the control information, the authentication encoding algorithm may utilize a second integrity key (e.g., $K_{RRCint}$) including a first subset of bits of the fourth pseudorandom multi-bit value, and a second integrity initialization vector (e.g., $IV_{RRCint}$) including a second subset of bits of the fourth pseudorandom multi-bit value.

Once the set of one or more blocks of control information has been encrypted and/or encoded, the first communication device may transmit the set of one or more blocks of control information on the control plane.

In some scenarios, the first communication device may encrypt and/or encode a plurality of sets of one or more blocks of communication data and/or a plurality of sets of one or more blocks of control information. In some scenarios, any or all of the initialization vectors may further include a counter that is incremented following encryption and/or encoding of each set of one or more blocks. The first communication device may generate a new iteration of each of the one or more pseudorandom multibit values (e.g., the outputs of one or more of the KDFs 602-608) upon the counter rolling over (e.g., resetting or returning to its initial value). Thus, using the KDF to generate the nonce values allows the first and second wireless devices to obtain new nonce values at every key update without exchanging additional data over the air. Also, these nonce values may be considered a shared secret, like the keys generated by the KDF. Using the KDF also extends forward secrecy guarantees of the $K_{gNB}$ to the generated nonce values (e.g., the nonce values will be secret between gNBs).

The second communication device may receive the communication data and/or the control information in a similar manner. For example, the second communication device may generate one or more pseudorandom multibit values (e.g., the same outputs of one or more of the KDFs 602-608). The second communication device may receive the encrypted and/or encoded signal from the first communication device on the user plane or the control plane.

If the signal is received on the user plane, the second communication device may decrypt a first set of one or more blocks of the received signal using a decryption algorithm that utilizes an encryption key as a first input and an encryption initialization vector as a second input. For example, while decrypting the received communication signal, the decryption algorithm may utilize, as the first input, the first encryption key (e.g., $K_{UPenc}$), which, as noted above, may include a first subset of bits of the first pseudorandom multi-bit value, and may utilize, as the second input, the first encryption initialization vector (e.g., $IV_{UPenc}$), which, as noted above, may include a second subset of bits of the first pseudorandom multi-bit value.

Additionally, or alternatively, the second communication device may decode the first set of one or more blocks of the received signal using an authentication decoding algorithm that utilizes an integrity key as a first input and an integrity initialization vector as a second input. For example, while decoding the received communication signal, the authentication decoding algorithm may utilize the first integrity key (e.g., $K_{UPint}$), as defined above, as the first input, and the first integrity initialization vector (e.g., $IV_{UPint}$), as defined above, as the second input.

Similarly, if the signal is received on the control plane, the second communication device may decrypt a first set of one or more blocks of the signal using the decryption algorithm. For example, while decrypting the received signal, the decryption algorithm may utilize the second encryption key (e.g., $K_{RRCenc}$), as defined above, as the first input, and the second encryption initialization vector (e.g., $IV_{RRCenc}$), as defined above, as the second input.

Additionally, or alternatively, the first communication device may decode the first set of one or more blocks of the signal received on the control plane using the authentication decoding algorithm. For example, while decoding the received signal, the authentication decoding algorithm may utilize the second integrity key (e.g., $K_{RRCint}$), as defined above, as the first input, and the second integrity initialization vector (e.g., $IV_{RRCint}$), as defined above, as the second input.

In some scenarios, the second communication device may decrypt and/or decode a plurality of sets of one or more blocks of the received signal. In some scenarios, any or all of the initialization vectors may further include a counter that is incremented following decryption and/or decoding of each set of one or more blocks. The second communication device may generate a new iteration of each of the one or more pseudorandom multibit values (e.g., the outputs of one or more of the KDFs 602-608) upon the counter rolling over (e.g., resetting or returning to its initial value). The generation of the new pseudorandom multibit values (and therefore the new keys and/or nonce values) may be synchronized between the first communication device and the second communication device.

Figure 7:
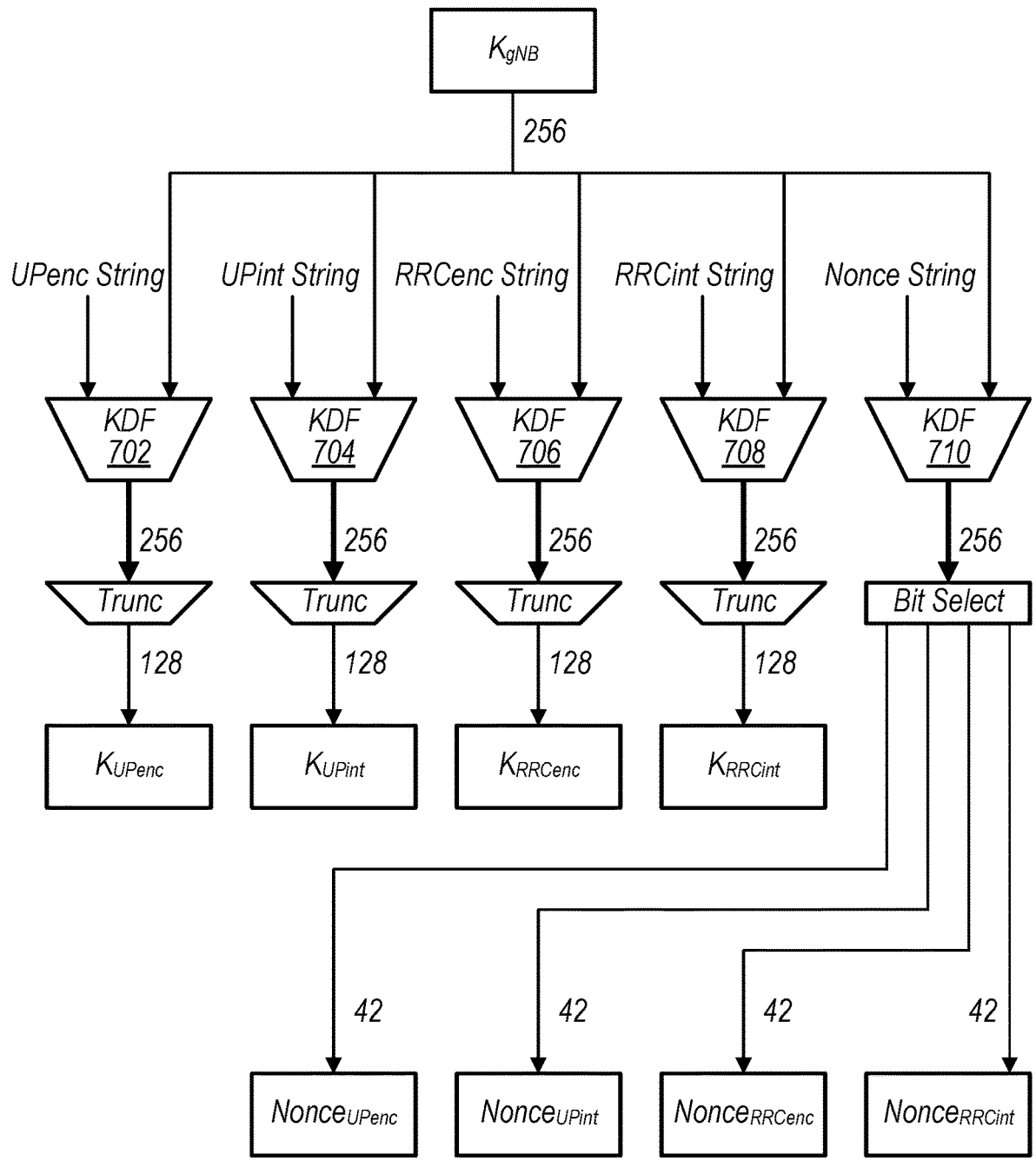
FIG. 7 illustrates example logic for generating a plurality of pseudorandom nonce values, separately from the generation of associated keys, according to some embodiments.

FIG. 7—Generating Randomized IV via Additional KDF

As another example, FIG. 7 illustrates logic for generating four keys for use in encrypting and authenticating communications between the UE 106 and the base station 102, based on the key $K_{gNB}$, wherein a fifth value is generated to serve as a source of multiple nonce values, according to some embodiments. The logic of FIG. 7 may be implemented by the UE 106. The logic of FIG. 7 may also, or alternatively, be implemented by the base station 102.

As illustrated in FIG. 7, a communication device (e.g., the UE 106 or the base station 102) may execute four KDFs 702, 704, 706, and 708, which may operate in a manner similar, or identical, to the KDFs 602, 604, 606, and 608, respectively, to generate the keys $K_{UPenc}$, $K_{UPint}$, $K_{RRCenc}$, and $K_{RRCint}$. However, according to the logic of FIG. 7, nonce values are not generated from the remaining portions of the outputs of the KDFs 702, 704, 706, and 708.

Instead, the communication device may execute a fifth KDF 710 to generate a plurality of nonce values for use in a plurality of IVs. The KDF 710 may take as inputs two or more values known to both the UE 106 and the base station 102. For example, one input may be, or include, the key $K_{gNB}$. Another input may be, or include, a string or other value specifically associated with generating nonce values. For example, as shown, the KDF 710 receives an input Nonce String, which may include a first value associated with (e.g., identifying) one or more functions of the IVs, a second value identifying the cipher algorithm and/or an authentication encoding algorithm to be used in association with the IVs, and/or other information relevant to the encryption and/or encoding of communications to be transmitted on the user plane and/or the control plane.

As one example, the communication device may generate $IV_{UPenc}$, including the nonce value $Nonce_{UPenc}$, which includes, or constitutes, a first subset of bits of the output of the KDF 710. Similarly, the communication device may generate $IV_{UPinc}$, including the nonce value $Nonce_{UPinc}$, which includes, or constitutes, a second subset of bits of the output of the KDF 710; $IV_{RRcenc}$, including the nonce value $Nonce_{RRcenc}$, which includes, or constitutes, a third subset of bits of the output of the KDF 710; and/or $IV_{RRCinc}$, including the nonce value $Nonce_{RRCinc}$, which includes, or constitutes, a fourth subset of bits of the output of the KDF 710. In some scenarios, the four subsets of bits of the output of the KDF 710 may be mutually exclusive subsets. For example, in the example illustrated in FIG. 7, the output of the KDF 710 is 256 bits. In such an example, the first subset of bits may be drawn from the 64 most significant bits of the output, the second subset may be drawn from the 64 next-most significant bits of the output, the third subset may be drawn from the 64 next-most significant bits of the output, and the fourth subset may be drawn from the 64 least significant bits of the output. Other arrangements are also envisioned.

It may be noted that, in the specific example illustrated in FIG. 7, each nonce value may have a maximum of 64 bits, if the four subsets are mutually exclusive. However, some implementations of IV, such as the examples shown in FIG. 5D and FIG. 5E, may require, or expect, more than 64 bits. In some such scenarios, the remaining bits may be padded with zeros.

Alternatively, the communication device may execute the KDF 710 a second time, to generate a second plurality of nonce values, which may allow generation of larger nonce values. For example, the communication device may generate $Nonce_{UPenc}$ as including a first subset of bits drawn from the 128 most significant bits of the first output of the KDF 710; $Nonce_{UPint}$ as including a second subset of bits drawn from the 128 least significant bits of the first output of the KDF 710; $Nonce_{RRCenc}$ as including a third subset of bits drawn from the 128 most significant bits of the second output of the KDF 710; and $Nonce_{UPint}$ as including a fourth subset of bits drawn from the 128 least significant bits of the second output of the KDF 710. As another example, the communication device may generate $Nonce_{UPenc}$ as including a first subset of bits drawn from the 64 most significant bits of the first output of the KDF 710 and the 64 most significant bits of the second output of the KDF 710; $Nonce_{UPint}$ as including a second subset of bits drawn from the 64 next-most significant bits of the first output of the KDF 710 and the 64 next-most significant bits of the second output of the KDF 710; $Nonce_{RRCenc}$ as including a third subset of bits drawn from the 64 next-most significant bits of the first output of the KDF 710 and the 64 next-most significant bits of the second output of the KDF 710; and $Nonce_{UPint}$ as including a fourth subset of bits drawn from the 64 least significant bits of the first output of the KDF 710 and the 64 least significant bits of the second output of the KDF 710. Other arrangements are also envisioned. By executing the KDF 710 multiple times, the communication device may generate any appropriate number of bits of nonce value for use in IVs.

As with FIG. 6, the keys and IVs generated by the logic of FIG. 7 may be used by either the of the UE 106 or the base station 102 to encrypt and/or encode for integrity authentication either user plane communication data or control plane data. Similarly, either the of the UE 106 or the base station 102 may decrypt and/or decode received user plane or control plane data using the same key(s) and IV(s).

With regard to either FIG. 6 or FIG. 7, it should be understood that some implementations may utilize less than all four of the illustrated keys and all four of the illustrated IVs. For example, some encryption algorithms, such as AES-GCM may use only a single key/IV pair for both encryption and authentication. Thus, the communication device may generate $K_{UPenc}$ and $IV_{UPenc}$, but not $K_{UPinc}$ and $IV_{UPinc}$ (or vice versa) for transmitting and receiving on the user plane and $K_{RRCenc}$ and $IV_{RRCenc}$, but not $K_{RRCinc}$ and $IV_{RRCinc}$ (or vice versa) for transmitting and receiving on the control plane. Other scenarios may call for a different subset of the keys and IVs described herein.

Example Implementations

Certain examples consistent with the preceding description may be implemented as follows.

A wireless communication device may implement a method for receiving encrypted communications. The method may include generating a first pseudorandom multi-bit value; receiving a first encrypted communication signal on a user plane; and decrypting a first set of one or more blocks of the received communication signal using a decryption algorithm that utilizes an encryption key as a first input and an encryption initialization vector as a second input, wherein, while decrypting the first encrypted communication signal, the decryption algorithm utilizes a first encryption key including a first subset of bits of the first pseudorandom multi-bit value as the first input, and a first encryption initialization vector including a second subset of bits of the first pseudorandom multi-bit value as the second input.

A wireless communication device may implement another method for receiving encrypted communications. The method may include executing a key derivation function (KDF) a first time to generate a first encryption key; executing the KDF a second time to generate a nonce value; receiving a first encrypted communication signal on a user plane; and decrypting a first set of one or more blocks of the received communication signal using a decryption algorithm that utilizes an encryption key as a first input and an encryption initialization vector as a second input, wherein, while decrypting the first encrypted communication signal, the decryption algorithm utilizes the first encryption key as the first input, and a first encryption initialization vector including a first subset of bits of the nonce value as the second input.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for generating encrypted communications, the apparatus comprising:
a memory storing software instructions; and
processing circuitry configured to execute the software instructions to cause the processing circuitry to:
generate a first pseudorandom multi-bit value;
encrypt a first set of one or more blocks of communication data using an encryption algorithm that utilizes an encryption key as a first input and an encryption initialization vector as a second input, wherein, while encrypting the communication data, the encryption algorithm utilizes a first encryption key including a first subset of bits of the first pseudorandom multi-bit value, and a first encryption initialization vector including a second subset of bits of the first pseudorandom multi-bit value; and
cause transmission of the encrypted communication data on a user plane.

2. The apparatus of claim 1, wherein the processing circuitry is configured to execute the software instructions to further cause the processing circuitry to:
encrypt a plurality of sets of one or more blocks of communication data using the encryption algorithm, wherein the encryption initialization vector further includes a counter that is incremented following encryption of each set of one or more blocks; and
generate a new iteration of the first pseudorandom multi-bit value when the counter resets to an initial value.

3. The apparatus of claim 1, wherein the processing circuitry is configured to execute the software instructions to further cause the processing circuitry to:
generate a second pseudorandom multi-bit value;
encrypt control information using the encryption algorithm, wherein, while encrypting the control information, the encryption algorithm utilizes a second encryption key including a first subset of bits of the second pseudorandom multi-bit value, and a second encryption initialization vector including a second subset of bits of the second pseudorandom multi-bit value; and
cause transmission of the encrypted control information.

4. The apparatus of claim 1, wherein the processing circuitry is configured to execute the software instructions to further cause the processing circuitry to:
generate a third pseudorandom multi-bit value; and
encode the communication data using an authentication encoding algorithm that uses an integrity key as a first input and an integrity initialization vector as a second input, wherein, while encoding the communication data, the authentication encoding algorithm utilizes a first integrity key including a first subset of bits of the third pseudorandom multi-bit value, and a first integrity initialization vector including a second subset of bits of the third pseudorandom multi-bit value.

5. The apparatus of claim 4, wherein the processing circuitry is configured to execute the software instructions to further cause the processing circuitry to:
generate a fourth pseudorandom multi-bit value; and
encode control information using the authentication encoding algorithm, wherein, while encoding the control information, the authentication encoding algorithm utilizes a second integrity key including a first subset of bits of the fourth pseudorandom multi-bit value, and a second integrity initialization vector including a second subset of bits of the fourth pseudorandom multi-bit value.

6. The apparatus of claim 1, wherein the processing circuitry is configured to execute the software instructions to further cause the processing circuitry to:
receive a first encrypted communication signal via the user plane; and
decrypt a first set of one or more blocks of the received communication signal using a decryption algorithm that utilizes an encryption key as a first input and an encryption initialization vector as a second input, wherein, while decrypting the first encrypted communication signal, the decryption algorithm utilizes the first encryption key as the first input, and the first encryption initialization vector as the second input.

7. The apparatus of claim 1, wherein generating a first pseudorandom multi-bit value includes executing a key derivation function (KDF).

8. A method for generating encrypted communications, the method comprising:
by a wireless communication device:
generating a first pseudorandom multi-bit value;
encrypting a first set of one or more blocks of communication data using an encryption algorithm that utilizes an encryption key as a first input and an encryption initialization vector as a second input, wherein, while encrypting the communication data, the encryption algorithm utilizes a first encryption key including a first subset of bits of the first pseudorandom multi-bit value, and a first encryption initialization vector including a second subset of bits of the first pseudorandom multi-bit value; and
transmitting the encrypted communication data on a user plane.

9. The method of claim 8, further comprising:
encrypting a plurality of sets of one or more blocks of communication data using the encryption algorithm, wherein the encryption initialization vector further includes a counter that is incremented following encryption of each set of one or more blocks; and
generating a new iteration of the first pseudorandom multi-bit value when the counter resets to an initial value.

10. The method of claim 8, further comprising:
generating a second pseudorandom multi-bit value;
encrypting control information using the encryption algorithm, wherein, while encrypting the control information, the encryption algorithm utilizes a second encryption key including a first subset of bits of the second pseudorandom multi-bit value, and a second encryption initialization vector including a second subset of bits of the second pseudorandom multi-bit value; and
transmitting the encrypted control information.

11. The method of claim 8, further comprising:
generating a third pseudorandom multi-bit value; and
encoding the communication data using an authentication encoding algorithm that uses an integrity key as a first input and an integrity initialization vector as a second input, wherein, while encoding the communication data, the authentication encoding algorithm utilizes a first integrity key including a first subset of bits of the third pseudorandom multi-bit value, and a first integrity initialization vector including a second subset of bits of the third pseudorandom multi-bit value.

12. The method of claim 11, further comprising:
generating a fourth pseudorandom multi-bit value; and
encoding control information using the authentication encoding algorithm, wherein, while encoding the control information, the authentication encoding algorithm utilizes a second integrity key including a first subset of bits of the fourth pseudorandom multi-bit value, and a second integrity initialization vector including a second subset of bits of the fourth pseudorandom multi-bit value.

13. The method of claim 8, further comprising:
receiving a first encrypted communication signal on the user plane; and
decrypting a first set of one or more blocks of the received communication signal using a decryption algorithm that utilizes an encryption key as a first input and an encryption initialization vector as a second input, wherein, while decrypting the first encrypted communication signal, the decryption algorithm utilizes the first encryption key as the first input, and the first encryption initialization vector as the second input.

14. The method of claim 8, wherein generating a first pseudorandom multi-bit value includes executing a key derivation function (KDF).

15. A wireless communication device, comprising:
a radio; and
processing circuitry communicatively coupled to the radio, the processing circuitry configured to cause the wireless communication device to:
execute a key derivation function (KDF) a first time to generate a first encryption key;
execute the KDF a second time to generate a nonce value;
encrypt data using an encryption algorithm that utilizes an encryption key as a first input and an initialization vector as a second input, wherein, while encrypting a portion of the data for transmission on a user plane, the encryption algorithm utilizes the first encryption key as the first input, and a first initialization vector including a first subset of bits of the nonce value as the second input; and
transmit the encrypted data via the radio.

16. The wireless communication device of claim 15, wherein the processing circuitry is further configured to cause the wireless communication device to:
execute the KDF a third time to generate a second encryption key;
wherein, while encrypting a portion of the data for transmission on a control plane, the encryption algorithm utilizes the second encryption key as the first input, and a second initialization vector including a second subset of bits of the nonce value as the second input.

17. The wireless communication device of claim 15, wherein the processing circuitry is further configured to cause the wireless communication device to:
execute the KDF a fourth time to generate a first integrity key; and
encode data using an authentication encoding algorithm that uses an integrity key as a first input and an initialization vector as a second input, wherein, while encoding a portion of the data for transmission on the user plane, the authentication encoding algorithm utilizes the first integrity key as the first input, and a third initialization vector including a third subset of bits of the nonce value as the second input.

18. The wireless communication device of claim 17, wherein the processing circuitry is further configured to cause the wireless communication device to:
execute the KDF a fifth time to generate a second integrity key;
wherein, while encoding a portion of the data for transmission on the control plane, the authentication encoding algorithm utilizes the second integrity key as the first input, and a fourth initialization vector including a fourth subset of bits of the nonce value as the second input.

19. The wireless communication device of claim 15, wherein the processing circuitry is further configured to cause the wireless communication device to:
encrypt a plurality of sets of one or more blocks of communication data using the encryption algorithm, wherein the encryption initialization vector further includes a counter that is incremented following encryption of each set of one or more blocks; and
generate a new iteration of the first pseudorandom multi-bit value when the counter resets to an initial value.

20. The wireless communication device of claim 15, wherein the processing circuitry is further configured to cause the wireless communication device to:
- receive, via the radio, a first encrypted communication signal on the user plane; and
- decrypt a first set of one or more blocks of the received communication signal using a decryption algorithm that utilizes an encryption key as a first input and an encryption initialization vector as a second input, wherein, while decrypting the first encrypted communication signal, the decryption algorithm utilizes the first encryption key as the first input, and the first encryption initialization vector as the second input.

* * * * *